United States Patent
Menich et al.

[11] Patent Number: 5,327,575
[45] Date of Patent: Jul. 5, 1994

[54] DIRECTIONAL HANDOVER CONTROL IN DIGITAL MOBILE RADIO SYSTEMS EMPLOYING MAHO

[75] Inventors: Barry J. Menich, Schaumburg; Jeffrey D. Bonta, Arlington Heights, both of Ill.

[73] Assignee: Motorola, Inc., Schaumburg, Ill.

[21] Appl. No.: 856,278

[22] Filed: Mar. 23, 1992

[51] Int. Cl.$^5$ ............... H04B 1/00; H04B 7/00; H04M 11/00
[52] U.S. Cl. .................. 455/33.2; 455/33.1; 455/54.1; 455/56.1; 379/60
[58] Field of Search .............. 455/33.1, 34.1, 33.2, 455/56.1, 54.1, 62; 379/59, 60

[56] References Cited

U.S. PATENT DOCUMENTS 5,038,399 8/1991 Bruckert ............... 455/33.1
5,179,559 1/1993 Crisler et al. ............ 455/33.1

Primary Examiner—Reinhard J. Eisenzopf
Assistant Examiner—Thanh C. Le
Attorney, Agent, or Firm—Jon P. Christensen

[57] ABSTRACT

A method of selecting handover targets for a communication unit exchanging a communicated signal through a serving base site in a digital cellular system. The method uses timing advance to determine a relative distance of a communication unit to the serving base site. The method comprising the steps of comparing a timing advance value with a first threshold. The first threshold may be equal to a distance one and one-half times the radius of the serving cell. When the timing advance value exceeds the first threshold, a base site frequency list is modified to include base sites non-adjacent the serving base site. The identity of the non-adjacent base sites may be determined from the directionality of the communication unit. The method further includes the step of selecting a handover target providing a highest relative RSSI value to the communication unit from the modified base site frequency list.

3 Claims, 3 Drawing Sheets

DIRECTIONAL HANDOVER CONTROL IN DIGITAL MOBILE RADIO SYSTEMS EMPLOYING MAHO

FIELD OF THE INVENTION

The field of the invention relates to radio communication systems and, in specific, to digital radio communication systems.

BACKGROUND OF THE INVENTION

Digital cellular communication systems are known. Such systems are, typically, comprised of a number of cells, each having a service coverage area, and a number of cellular telephones (communication units) (also sometimes referred to hereinafter as mobile stations or MSs). The service coverage areas of adjacent cells are typically arranged to partially overlap in such a manner as to provide a substantially continuous coverage area in which a communication unit receiving service from one cell may be handed off to an adjacent cell with no interruption in service. The Groupe Special Mobile (GSM) Pan-European digital cellular system, as specified in GSM recommendations available from the European Telecommunications Standards Institute (ETSI) is an example of just such a system.

The GSM system is a TDM/TDMA system providing eight full duplex signal paths (8 TDM slots per TDM frame) on each radio channel. A single, primary radio channel assigned to a base transceiver station (BTS) located at a base site within a cell, by virtue of its being time multiplexed, can support up to seven full rate duplex traffic users (speech or data) in addition to a multiplexed common control channel within the eight TDM slots.

Exchanges of paging and setup control information within GSM between MSs and BTSs typically occurs on the common control channel (CCCH) which occupies at least one slot of a primary channel of the BTS. Transmitted by the BTS on the CCCH are distinctive identification signals as well as synchronization and timing information common to all other frequencies and slots of the BTS. CCCH information allows an MS to differentiate between primary and non-primary channels.

Upon activation, an MS scans a pre-programmed spectrum in search of CCCH identification signals transmitted from nearby BTSs. Upon detecting a CCCH identification signal, the communication unit measures a signal quality factor (such as signal strength) of the identification signal as a means of determining relative proximity of the BTS. Upon completing the scan of frequencies within the spectrum, the MS generally selects the BTS providing the largest relative signal quality factor as a serving BTS. Upon identifying, and locking onto a suitably strong signal, the communication unit monitors the selected CCCH for incoming calls. While monitoring the serving BTS, the MS receives an adjacent base site frequency list on the CCCH of the serving BTS. The set of frequencies identifies the spectral location of primary channels of BTSs, adjacent the serving BTS. Limitation of the set of frequencies to BTSs adjacent the serving BTS reduces the time period required to measure, and transfer to a serving BTS the signal strength values of BTSs that are presumably the best handover candidates. Limitation of the set of frequencies to adjacent BTSs also reduces the possibility of handover to a distant BTS with a high signal strength value caused by signal propagation anomalies.

During normal operation (including during active calls), the MS monitors for, identifies, and measures a received signal strength indication (RSSI) of primary channels of nearby BTSs. The MS detects and measures the RSSI of nearby BTSs by reference to the frequency list communicated to the MS by the serving BTS. Upon detection of a signal of a nearby BTS, the MS also decodes an ID of the nearby BTS.

If involved in an active call, the MS relays measurement information back to the base site on an associated signaling channel. Through such a process, it is possible for the MS to maintain an association with the most appropriate (proximate) BTS. The process may entail an autonomous switching by the MS to a different BTS, causing perhaps a re-registration by the MS with the system indicating that such a switch has occurred. Alternatively, during an active communication exchange, the MS may be commanded by the system to handover to a more appropriate BTS. Handover based upon information provided to the BTS by the MS is commonly referred to as a mobile assisted handover (MAHO).

Under GSM, a decision to handoff a communication unit to a target BTS may be based upon a power budget expression (see GSM Recommendation 5.08). The power budget expression provides a method of comparing a path loss between an MS and serving cell with a path loss between the MS and a potential handoff target cell.

Under GSM, handover may also be desirable when the MS exceeds a specified distance from a serving BTS. Handoff may be desirable in such case to minimize effective cell size and to insure that an MS is served from the nearest BTS. Other handover causes, as specified in GSM recommendation 5.08, include handover for reason of RXQUAL (high bit-error-rate threshold), and handover for reason of RXLEV (down link threshold or uplink threshold).

Where the decision to handoff is based on distance, the parameter that may be used as an indication of distance is timing advance. Timing advance is a parameter measured by a BTS based upon round-trip signal delay of a signal transmitted from the serving BTS to the MS and back to the BTS. The measured value is then used to adjust the timing of the MS to ensure that transmissions from an MS arrive at a BTS within the TDM slot assigned to the MS.

While the prior art handover algorithm has worked well, problems may be experienced in target selection. Under GSM, potential targets are determined from RSSI values measured by the MS. Potential targets, on the other hand, are limited to BTSs adjacent the serving BTS (as determined by the frequency list communicated to the MS). If handover is deferred because a target BTS is operating at capacity, then the MS may move past adjacent BTSs into the service areas of non-adjacent BTSs. As the MS continues to receive service through the original serving BTS the MS may not detect nearby non-adjacent BTSs (as in the case of a fast mobile moving through micro cells). If the MS moves too far from the serving BTS before a channel becomes available in an adjacent BTS then the MS may be dropped. Even if not dropped, an MS operating relatively far from a serving BTS, presumably at full power, may create a source of interference sufficient to cause dropped calls in the case of other MSs.

When a channel becomes available in a target BTS (adjacent the original serving BTS) a handover may take place to the target BTS. At that time, a new frequency list may be transferred to the MS. The MS may now measure an RSSI value of a target BTS adjacent the new serving BTS, and a further handover may take place that finally places the MS in the most proximate cell. The result of all of this handover activity is a ratcheting of the MS from one cell to another; from the original serving BTS, to an adjacent BTS, to a proximate BTS. Ratcheting not only consumes valuable control resources of a communication system but also reduces the availability of traffic channels as intermediate BTSs alternately reserve, and then release, traffic channels as the MS ratchets to a proximate BTS.

Ratcheting may also occur as a result of signal anomalies where obstructions or other local signal propagation characteristics cause a MS to pass through adjacent BTS service areas without handover. Because of the problem associated with ratcheting, a need exists for a better method of identifying proximate BTSs by MSs.

SUMMARY OF THE INVENTION

A method of selecting handover targets for a communication unit exchanging a communicated signal through a serving base site in a digital cellular system. The method comprising the steps of comparing a timing advance value with a first threshold, and, when the timing advance value exceeds the first threshold, modifying a base site frequency list to include base sites non-adjacent the serving base site. The method further includes the step of selecting a handover target providing a highest relative RSSI value to the communication unit from the modified base site frequency list.

DETAILED DESCRIPTION OF THE PREFERRED EMBODIMENT

The solution to the problem of identifying nearby base sites lies, conceptually, in dynamically modifying the list of base site frequencies transmitted from a serving base site to a communication unit, about to be transferred, based upon directionality and timing advance. Directionality in a sectored cell may be established by a sector ID. Directionality in an omnidirectional cell may be established through an interactive process by first transmitting a list of frequencies containing BTSs in representative locations and then updating the list of frequencies based on the ID of the representative base site providing a higher relative RSSI value to the MS.

Figure 1:
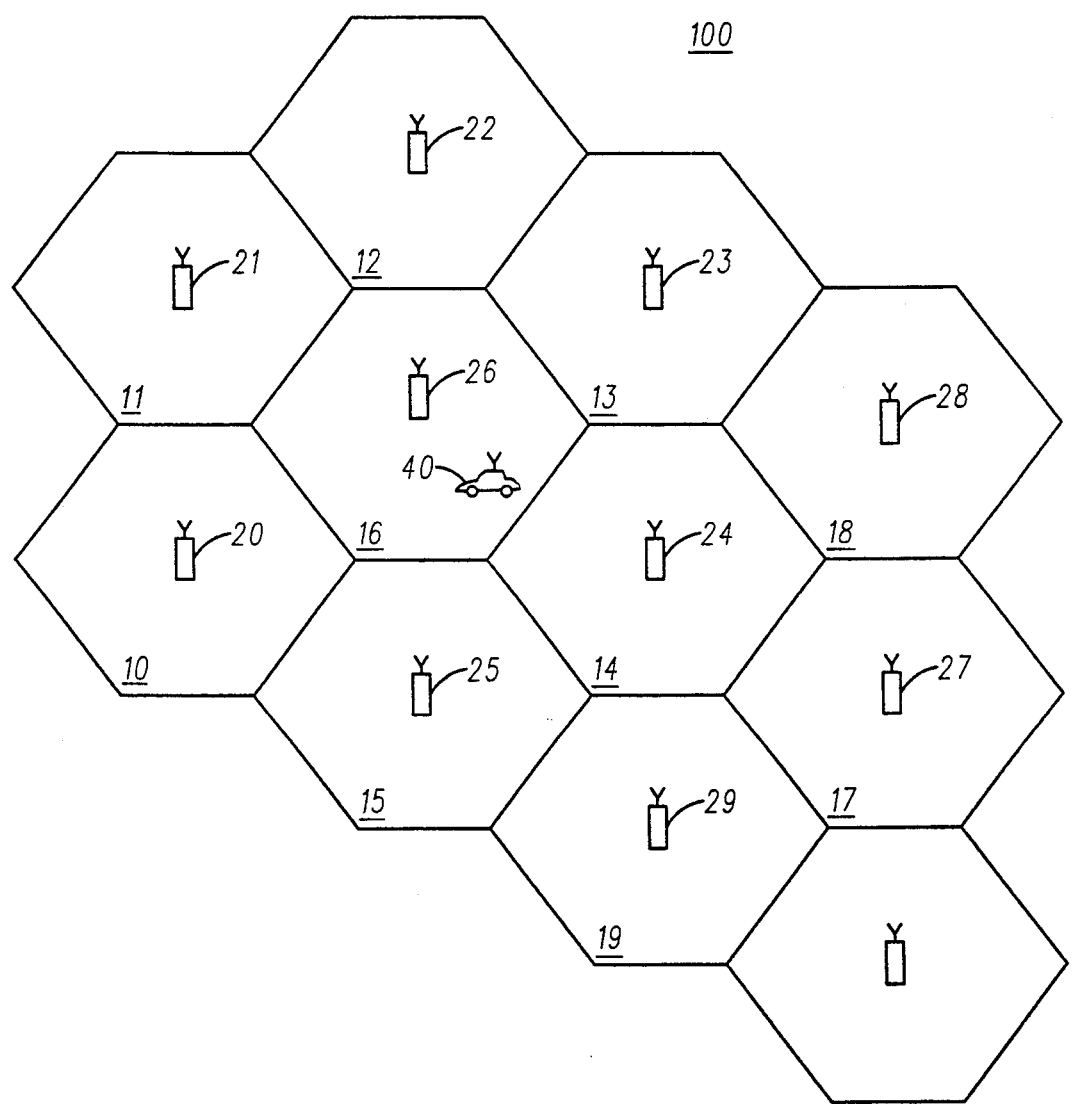
FIG. 1 depicts a cellular radiotelephone communication system including a number of cells and a communication unit, according to the invention.

Shown in FIG. 1 is a communication system (100), generally, under the invention. Included with the communication system (100) are a number of service coverage areas (10-19), each containing a base site (20-29) that may be centrally located within the coverage area (10-19). Communication services within such a system (100) are typically available within service coverage areas (10-19) from a BTS located at each of the base sites (20-29).

Figure 2:
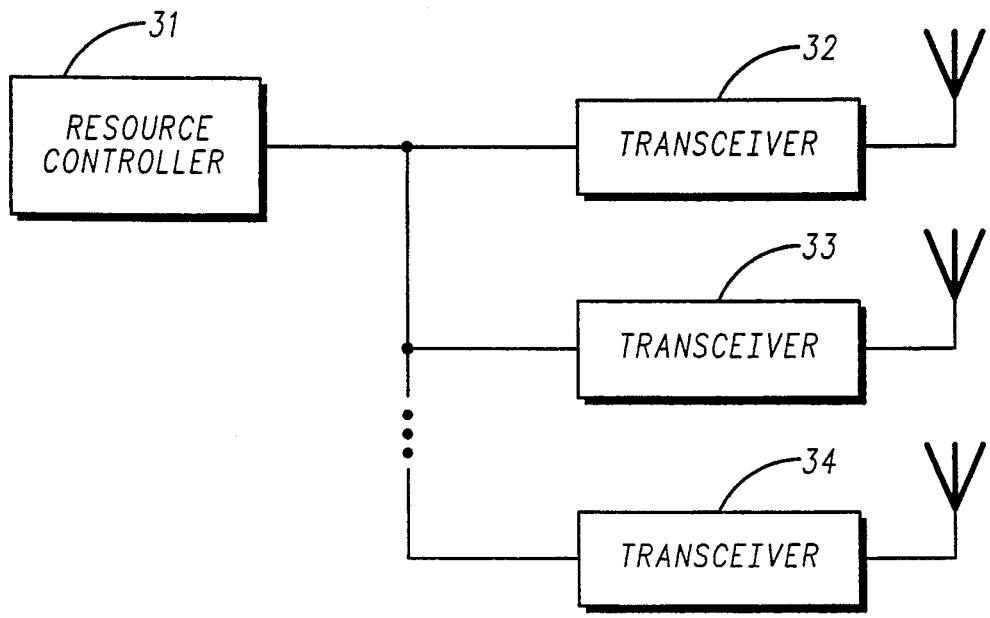
FIG. 2 comprises a block diagram of a base transceiver station located at a base site under the invention.

Shown in FIG. 2, generally, is a block diagram of a BTS (30), in accordance with the invention. Included within the BTS (30) is a resource controller (31), and transceivers (32-34).

A BTS (30), located at a base site (26) (hereinafter referred to as "BTS 26"), is constructed to transmit identification and timing signals on a control resource (slot 1) as generally provided under GSM recommendations. Each BTS (20-29) transmits a list of base site frequencies, to inactive MSs, for purposes of RSSI measurement of adjacent BTSs (e.g. BTS 26 transmits a list of primary frequencies of BTSs 20-25) also as provided under GSM.

Figure 3:
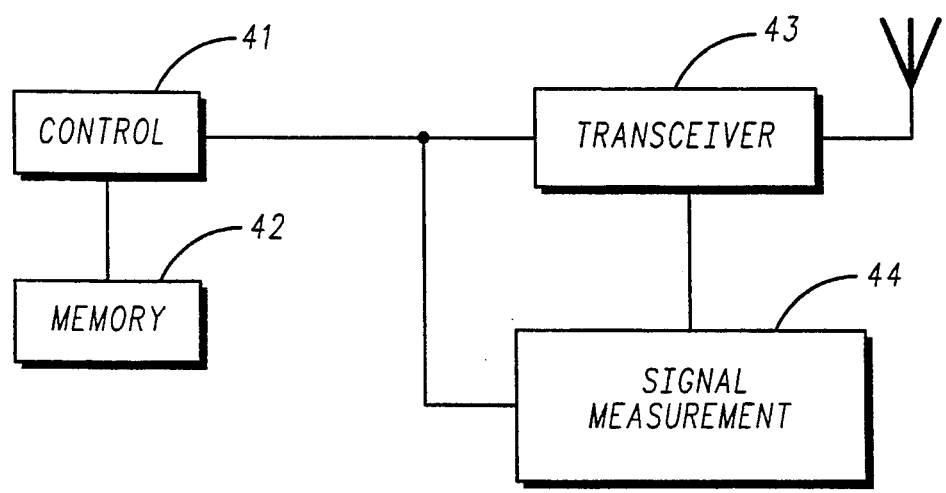
FIG. 3 comprises a block diagram of a communication unit, according to the invention.

Shown in FIG. 3 is an MS (40), generally, in accordance with the invention. Included within the MS (40) is a controller (41) and associated memory (42), a transceiver (43), and a signal measurement device (44).

Inactive MSs (40) within the communication system (100) are constructed to monitor a proximate BTS (20-29) and measure RSSI values of BTSs (20-29) identified to the MS by the monitored BTS (20-29). Base site frequencies identified to the MS (40) by the proximate BTS (20-29) are stored within the memory (42) for subsequent RSSI measurement. During the inactive state the MS (40) selects the BTS (20-29) providing the highest relative RSSI value as the monitored BTS (20-29).

Call requests, call set-up, and call maintenance within the communication system (100) are handled as provided by GSM. During an active call the base site frequency list is communicated to an active MS (40) on an associated signaling channel (e.g. a slow associated signaling channel (SAACH)). RSSI values and IDs of as many as six BTSs (20-29) are returned to a serving BTS (20-29), also, on the SACCH.

Upon call set-up an MS (40) is assigned to a traffic channel (TCH) within a TDM slot (1-7) on a primary channel or 0-7 on a secondary channel). The signal from MS (40) is maintained within the slot by a timing advance value transmitted to the MS (40) by the serving BTS (e.g. 26).

The content of the base site frequency list, in accordance with the invention, is generated under a suitable algorithm. Under one embodiment of the invention the contents of the base site frequency list are dependent upon the results of a comparison of the timing advance value with a set of timing advance threshold values.

Under such an embodiment a first threshold value may be made equal to the timing advance value of an MS (40) located at a distance from the serving BTS (e.g. 1½ times the radius of the serving cell (10-19). Where the timing advance value is less than the first threshold, the serving BTS (e.g. 26) transmits a first set of base site frequencies including BTSs (20-25) adjacent the serving BTS (26). Where the timing advance value exceeds the first threshold, the base site frequency list is adjusted, in accordance with the invention, to include non-adjacent BTSs. Different frequency lists, in fact, may be generated based upon a series of threshold values representing distance, and direction, from a serving BTS.

Figure 4:
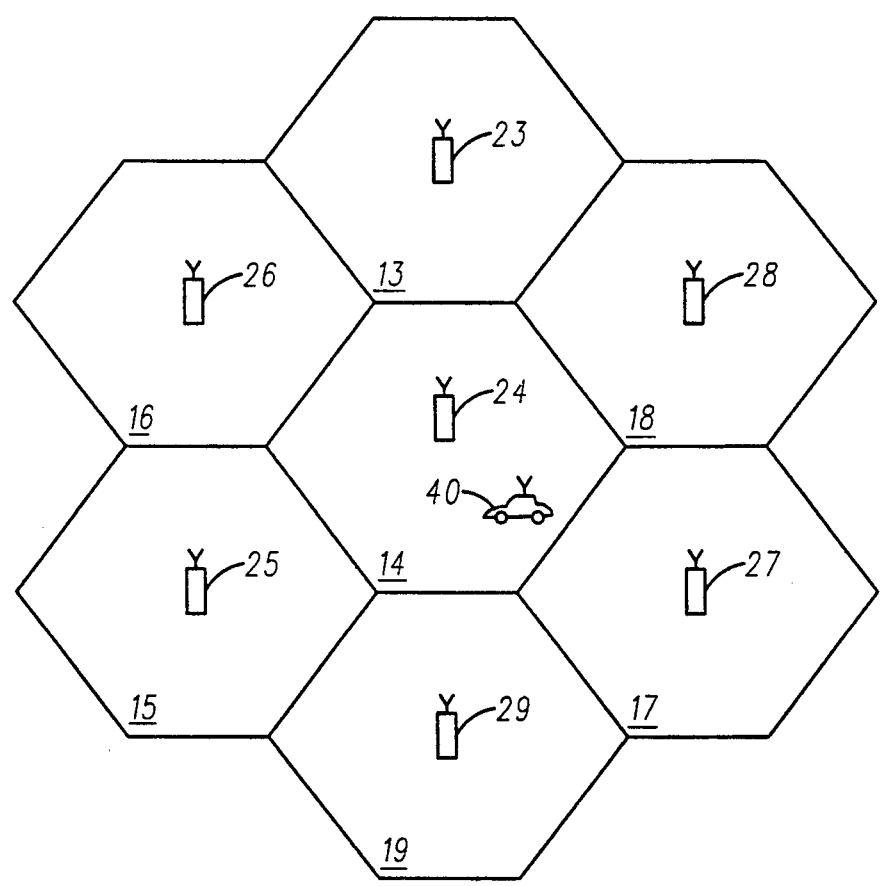
FIG. 4 depicts a communication unit passing out of a serving cell into an adjacent cell, in accordance with the invention.

By way of example, MS 40 requests access to and is granted a TCH through BTS 26. The base site frequency list communicated to the MS (40) includes BTSs (20-25). As a communicated signal is exchanged by the MS (40) through the serving BTS (26) the MS (40) may move into an adjacent cell (14, FIG. 4) and now be closer to an adjacent BTS (24). The MS (40) during such move continues to transmit RSSI values to the serving BTS (26). Upon entering the adjacent cell (14) the RSSI value from BTS 24 may indicate the need for a handover from the original serving BTS (26) to the adjacent BTS (24). If a TCH is available at BTS (24) the original serving BTS (26) transmits control information to the MS (40) causing the MS (40) to handover to the adjacent BTS (24).

If a TCH is not available at the adjacent BTS (24) then the MS (40) continues to move across the adjacent cell (14) exchanging a communicated signal through the original serving BTS (26). As the MS (40) continues to move away from the serving BTS (26), the timing advance value is increased, by the original serving BTS (26) to accommodate the increased range between the MS (40) and the serving BTS (26). As the MS (40) passes the first threshold, the serving BTS (26) modifies the base site frequency list. Upon determining that the MS (40) has passed the first threshold, the serving BTS (26) now determines, based upon relative RSSI values, that the MS (40) is now proximate to BTS 24. Based upon such proximity, the serving BTS (26) now transmits a modified base site frequency list that includes the proximate BTS (24) and BTSs (25, 23, 28, 27, and 29) that are adjacent the proximate BTS (24).

As the MS (40) continues to move across the adjacent cell (14) and RSSI values from BTS (24) continues to provide the highest relative value the serving BTS (26) will continue to seek handover to the proximate BTS (24). If, on the other hand, the RSSI value of a non-adjacent BTS (27) should provide a higher relative value than the other BTSs (24, 25, 23, 28, 27, and 29) within the base site frequency list then the serving BTS (26) would seek handover to the non-adjacent BTS (27).

If, after entering the adjacent cell (14), the MS (40) should then proceed to enter adjacent cell (15) then the serving BTS (26) would detect such movement by relative RSSI values. In the case where RSSI values from BTSs 24 and 25 were substantially equal, the serving BTS (26) would alternately seek handover to either of the adjacent BTSs (24 or 25). If the timing advance value in such case should exceed the first threshold then the serving BTS (26) would add non-adjacent BTS 29 to the base site frequency list.

In another embodiment of the invention, timing advance may be used to reduce interference by precluding handover in circumstances involving a MS (40) located on an elevated structure (e.g. a hill, high-rise building, or bridge which provides an advantageous position to see many, or all, of the BTSs in system 100). In the case of an elevated structure, the MS (40) receiving service from a serving BTS (26) may be situated in a line-of-site position to an adjacent BTS (24) and measure a relatively high RSSI value even though the MS (40) is located within the serving cell (16) and closer to the serving BTS (26) than the adjacent BTS (24). Moreover, because of local reuse conditions, a handover of an MS (40) on an elevated structure may be a source of interference to BTSs (20-22).

In the case of elevated structures within a cell (10-19) a minimum distance threshold may be established. The minimum distance threshold may be a timing advance value equal to a cell radius. Under such an embodiment, handover is deferred until a serving BTS (26) determines that the minimum distance threshold has been exceeded.

Note that it may be possible (under unusual RF propagation conditions) for the highest signal strength that the MS (40) sees to indicate a different BTS than the proximate BTS. If these conditions are possible in system 100, then it is advantageous to use timing advance plus the two strongest adjacent BTSs to determine the new frequency list, etc. In the case where the two strongest adjacent BTSs cannot be correlated to the same direction from the serving cell, the new frequency list will revert to the original list of adjacent cells in an effort to determine a new directionality.

We claim:

1. A method of selecting handover targets for a communication unit exchanging a communicated signal through a serving base site in a digital cellular system, such method comprising the steps of:
   A) determining a directionality of the communication unit based upon a first set of measured RSSI values of base sites within a base site frequency list;
   B) comparing a timing advance value of the communication unit with a first threshold;
   C) when the timing advance value exceeds the first threshold, modifying the base site frequency list to include base sites non-adjacent the serving base site based upon the directionality of the communication unit; and
   D) selecting a handover target providing a highest relative RSSI value to the communication unit based upon a second set of measured RSSI values of base sites within the modified base site frequency list.

2. An apparatus for selecting handover targets for a communication unit exchanging a communicated signal through a serving base site in a digital cellular system, such apparatus comprising:
   A) means for determining a directionality of the communication unit based upon a first set of measured RSSI values of base sites within a base site frequency list;
   B) means for comparing a timing advance value of the communication unit with a first threshold;
   C) means for modifying the base site frequency list to include base sites non-adjacent the serving base site when the timing advance value exceeds the first threshold based upon the directionality of the communication unit; and
   D) means for selecting a handover target providing a highest relative RSSI value to the communication unit based upon a second set of measured RSSI values of base sites within the modified base site frequency list.

3. A method of selecting handover targets from a communication unit exchanging a communicated signal through a serving base site in a digital cellular system, such method comprising the steps of:
   A) measuring RSSI values of base sites within a base site frequency list for sites adjacent the serving base site;
   B) determining a directionality of the communication unit based upon the measured RSSI values;
   C) comparing a timing advance value of the communication unit with a first threshold;
   D) when the timing advance value exceeds the first threshold, modifying the base site frequency list to include base sites non-adjacent the serving base site based upon the directionality of the communication unit; and
   E) measuring RSSI values of base sites of base site frequency list including base sites non-adjacent the serving base site; and
   F) selecting a handover target providing a highest relative RSSI value to the communication unit from the modified base site frequency list.

* * * * *